(12) United States Patent
Wang et al.

(10) Patent No.: US 12,025,161 B2
(45) Date of Patent: Jul. 2, 2024

(54) JOINT STRUCTURE OF TELESCOPIC CYLINDER

(71) Applicant: BROGENT TECHNOLOGIES INC., Kaohsiung (TW)

(72) Inventors: Chih-Huang Wang, Kaohsiung (TW); Tien-Ni Cheng, Kaohsiung (TW)

(73) Assignee: BROGENT TECHNOLOGIES INC., Kaohsiung (TW)

( * ) Notice: Subject to any disclaimer, the term of this patent is extended or adjusted under 35 U.S.C. 154(b) by 0 days.

(21) Appl. No.: 18/310,983

(22) Filed: May 2, 2023

(65) Prior Publication Data

US 2023/0375013 A1 Nov. 23, 2023

(30) Foreign Application Priority Data

May 23, 2022 (TW) .................................. 111119172

(51) Int. Cl.
*F15B 15/16* (2006.01)
(52) U.S. Cl.
CPC .................................... *F15B 15/16* (2013.01)
(58) Field of Classification Search
CPC ........................................................ F15B 15/16
See application file for complete search history.

(56) References Cited

U.S. PATENT DOCUMENTS

| 234,407 | A | * | 11/1880 | Jay | ...................... | F15B 15/1438 |
| | | | | | | 92/128 |
| 1,174,788 | A | * | 3/1916 | Winn | ...................... | F15B 15/16 |
| | | | | | | 114/90 |
| 1,424,233 | A | * | 8/1922 | Berry | ...................... | F15B 15/16 |
| | | | | | | 92/206 |
| 6,902,342 | B1 | * | 6/2005 | Ditzler | ...................... | F16C 7/06 |
| | | | | | | 403/78 |

* cited by examiner

*Primary Examiner* — Dustin T Nguyen
(74) *Attorney, Agent, or Firm* — MUNCY, GEISSLER, OLDS & LOWE, P.C.

(57) ABSTRACT

Disclosed herein is a joint structure of a telescopic cylinder, the joint structure including a telescopic unit, an extension unit and a first fixing unit, wherein the telescopic unit includes a first main body, a first combined structure and at least one first fixing structure; the extension unit includes a second main body, a second combined structure and at least one second fixing structure; the first combined structure is screwed to the second combined structure; and the first fixing unit includes at least one first fixing body, and the first fixing body is simultaneously arranged in the first fixing structure and the second fixing structure and interferes with the first main body and the second main body so as to prevent the first combined structure and the second combined structure from spiral movement.

2 Claims, 11 Drawing Sheets

JOINT STRUCTURE OF TELESCOPIC CYLINDER

TECHNICAL FIELD

The disclosure relates to a joint structure of a telescopic cylinder, in particular to a joint structure for enhancing the structural strength of the telescopic cylinder.

BACKGROUND

Telescopic cylinders are common telescoping action assemblies in mechanical structures and can be divided into different types according to power sources, for example, pneumatic cylinders, oil cylinders, electric cylinders, etc.

Figure 1:
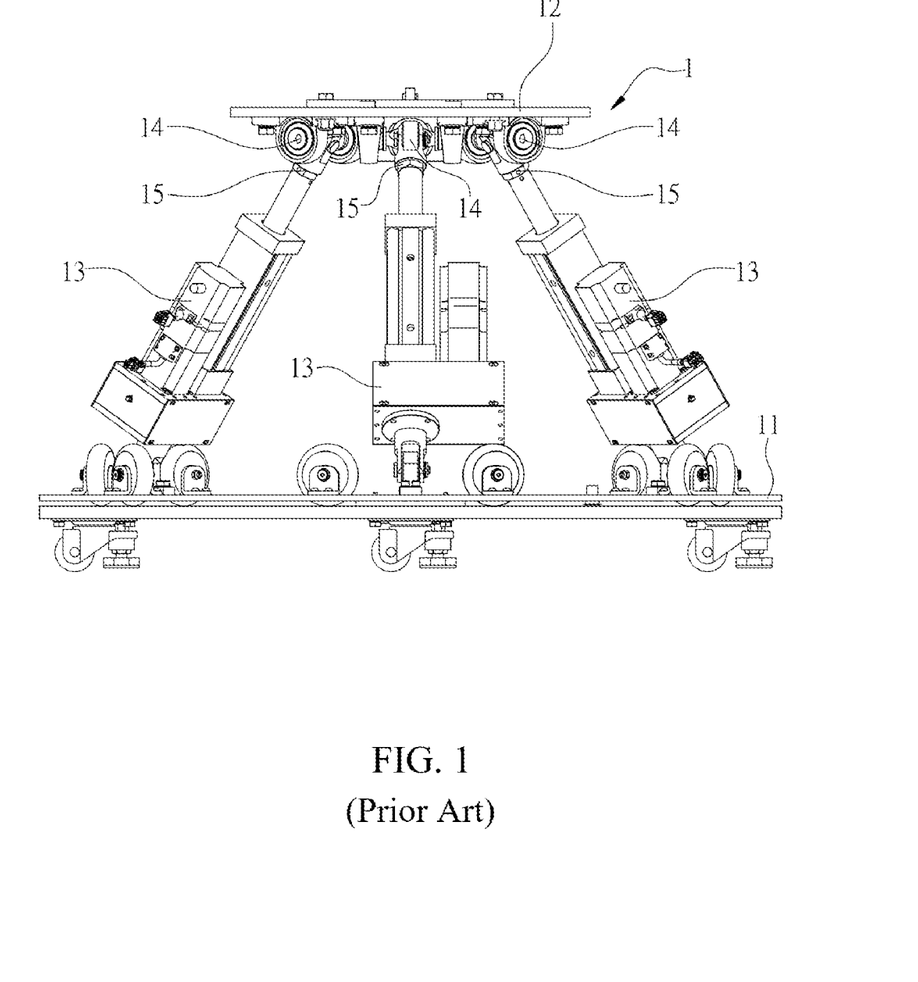
FIG. 1 is a three-dimensional schematic diagram illustrating a somatosensory device.

Please refer to FIG. 1 which shows a somatosensory device 1. The somatosensory device 1 comprises a base 11, a dynamic platform 12, and a plurality of telescopic cylinders 13 arranged between the base 11 and the dynamic platform 12, wherein universal structures 14 are arranged between the plurality of telescopic cylinders 13 and the dynamic platform 12 such that the dynamic platform 12 can act at various angles. Moreover, top ends of the plurality of telescopic cylinders 13 are of Y-shaped joint structures, which are special joints and will not be provided by merchants, so that connecting portions 15 are arranged at the tops of the plurality of telescopic cylinders 13, and appropriate joint structures can be mounted according to actual conditions after the telescopic cylinders 13 are provided.

Figure 2:
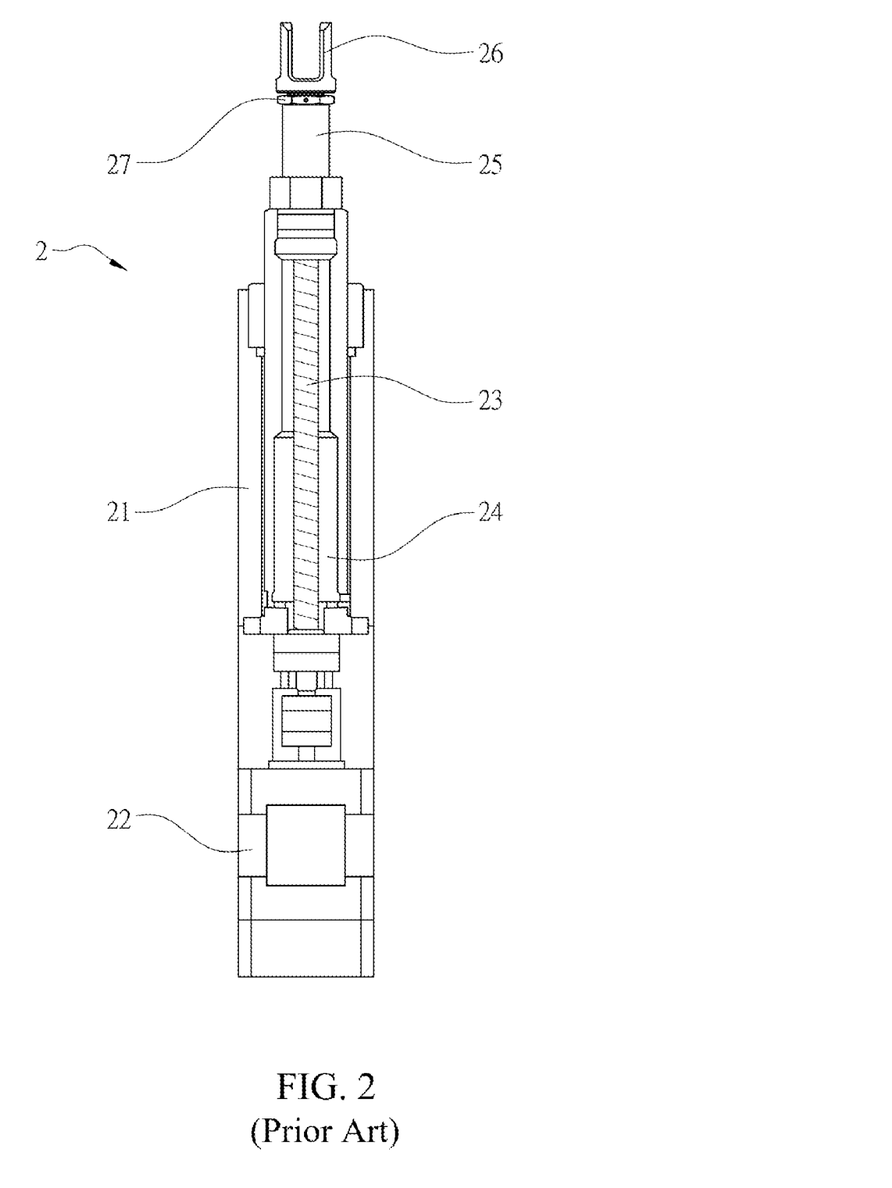
FIG. 2 is a sectional structure diagram illustrating a basic structure of a telescopic cylinder.

Please refer to FIG. 2 which illustrates a telescopic cylinder 2. The telescopic cylinder 2 comprises a housing 21, a motor 22 connected to the housing 21, a screw 23 arranged in the housing 21 and connected to the motor 22, a spiral sleeve 24 arranged on the screw 23, a telescopic rod 25 connected to the spiral sleeve 24, and a Y-shaped joint 26 arranged at one end of the telescopic rod 25, wherein the telescopic rod 25 is a hollowed rod body for accommodating the screw 23. The motor 22 of the telescopic cylinder 2 can drive the screw 23 to rotate and drive the spiral sleeve 24 to move such that the spiral sleeve 24 can slide in the housing 21 and drive the telescopic rod 25 to telescope relative to the housing 21 so as to control the Y-shaped joint 26 to produce the linear mechanical movement. Furthermore, a fastening ring 27 is arranged between the Y-shaped joint 26 and the telescopic rod 25, since the fastening ring 27 can better fasten the Y-shaped joint 26 in the screwed state, the Y-shaped joint 26 can be prevented from falling off from the telescopic rod 25.

Although a combined technology for the joints of the telescopic cylinders is disclosed in the prior art to provide the joint structures for configurations, the following defects still exist during actual usage:

1. Loosening of the Joints:

In the early stage, the above-mentioned fastening rings are used pressing structures in most of screwed structures formed by internal threads and external threads and are configured to fasten the engaged state of the internal threads and the external threads to prevent falling of the joints. However, the dynamic platform used in the somatosensory device will generate a strong rotation force during various somatosensory motions, the common fastening rings cannot resist the force plus a load above the dynamic platform, and then the condition of joint falling occurs.

2. Loosening of Internal Structures of the Telescopic Cylinders:

As mentioned above, when the dynamic platform of the somatosensory device performs the various somatosensory motions, power generated by the dynamic platform will be transferred to the spiral sleeves by means of the telescopic rods, resulting in loosening of the combined structure between the telescopic rods and the spiral sleeves due to the external force.

3. Difficulty in Modification of the Internal Structures of the Telescopic Cylinders:

Spaces inside the housings of the telescopic cylinders are fixed, and it is difficult to structurally strengthen the telescopic rods, the spiral sleeves and the combined structures by adding fastening structures, so that maintenance personnel must carry out scheduled maintenance, check the internal structures by disassembling the telescopic cylinders, and fasten the internal structures to ensure the structure safety of somatosensory device.

Therefore, how to enhance the structural strength of the telescopic cylinders to support the force when the somatosensory device operates and ensure the safety of an occupant is the urgent problem for persons skilled in the art to solve.

SUMMARY

This disclosure provides a joint structure of a telescopic cylinder.

The joint structure of the telescopic cylinder comprises a telescopic unit, an extension unit, and a first fixing unit.

The telescopic unit comprises a first main body, a first combined structure connected to the first main body, and at least one first fixing structure arranged on the first main body.

The extension unit comprises a second main body, a second combined structure connected to the second main body, and at least one second fixing structure arranged on the second main body. The first combined structure is screwed to the second combined structure.

The first fixing unit comprises at least one first fixing body, wherein the first fixing body is simultaneously arranged in the first fixing structure and the second fixing structure and interferes with the first main body and the second main body so as to prevent the first combined structure and the second combined structure from spiral movement.

In one embodiment, each of the at least one first fixing structure comprises a first recess formed in the first main body and a first fixing opening portion formed in the first main body and connected to the first recess. Each of the at least one second fixing structure comprises a second recess formed in the second main body and a second fixing opening portion formed in the second main body and connected to the second recess, and the first fixing opening portion is arranged opposite the second fixing opening portion, so that the first fixing body is simultaneously arranged in the first recess and the second recess by means of the first fixing opening portion and the second fixing opening portion.

In one embodiment, the first fixing structure further comprises a first placing opening portion formed in the first main body and connected to the first recess. The second fixing structure further comprises a second placing opening portion formed in the second main body and connected to the second recess. The first placing opening portion is connected to the first fixing opening portion, and the second placing opening portion is connected to the second fixing opening portion, so that the first fixing body enters and exits the first recess and the second recess by means of the first placing opening portion and the second placing opening portion In one embodiment, the first combined structure is an internal thread provided on the first main body, and the first fixing structure is an external thread provided on the first main body. A thread direction of the first combined structure is opposite to that of the first fixing structure, and the first fixing body is screwed on the first fixing structure.

In one embodiment, each of the at least one first fixing body comprises a first fixing member screwed on the first fixing structure and at least one first positioning member simultaneously fixed to the first fixing member and the second fixing structure.

In one embodiment, the joint structure of the telescopic cylinder further comprises a movable unit and a second fixing unit. The telescopic unit further comprises a first clamping structure arranged on the first main body. The movable unit comprises a third main body and an extending clamping structure arranged on the third main body. The second fixing unit comprises a second fixing body arranged between the first clamping structure and the extending clamping structure, and the first clamping structure is arranged at one end of the first main body.

In one embodiment, the second fixing body is an annular structure and comprises an inner ring portion and an outer ring portion arranged oppositely. The first clamping structure is fixed to the inner ring portion, and the extending clamping structure is fixed to the outer ring portion.

In one embodiment, the joint structure of the telescopic cylinder further comprises a movable unit and a second fixing unit. The telescopic unit further comprises a first clamping structure arranged on the first main body. The movable unit comprises a third main body and at least one extending clamping structure arranged on the third main body. The second fixing unit comprises a second fixing body arranged between the first clamping structure and the extending clamping structure, and the first clamping structure is an annular recess formed in a side edge of the first main body.

In one embodiment, the second fixing body comprises at least one second fixing member arranged on an outer side of the first main body and at least one clamping block arranged on an inner side of the second fixing member, and the clamping block is fixed to the first clamping structure.

In one embodiment, the second fixing unit further comprises at least one buffer member fixed to the second fixing body. The buffer member is configured to avoid at least one collision between the second fixing body and the interior of a housing of the telescopic cylinder, and a plurality of through holes are formed in the second fixing body.

According to the above, the first fixing body fixes the screwing position of the first main body and the second main body, and provides rotational support for the first main body and the second main body to resist rotational external forces and prevent the second fixing structure from detaching from the first fixing structure.

DETAILED DESCRIPTION

The illustrations may not be necessarily drawn to scale, and there may be other embodiments of the present disclosure which are not specifically illustrated. Thus, the specification and the drawings are to be regard as an illustrative sense rather than a restrictive sense. Moreover, the descriptions disclosed in the embodiments of the disclosure such as detailed construction, manufacturing steps and material selections are for illustration only, not for limiting the scope of protection of the disclosure. The steps and elements in details of the embodiments could be modified or changed according to the actual needs of the practical applications. The disclosure is not limited to the descriptions of the embodiments. The illustration uses the same/similar symbols to indicate the same/similar elements.

Figure 3:
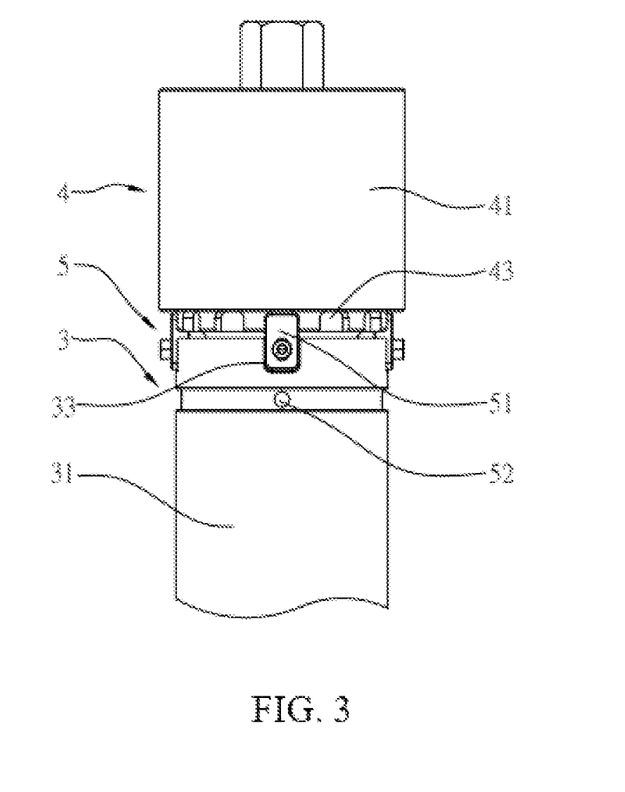
FIG. 3 is a local side view of a joint structure of a telescopic cylinder, illustrating a combined state of a telescopic unit, an extension unit and a first fixing unit according to a first embodiment of the present disclosure.
Figure 4:
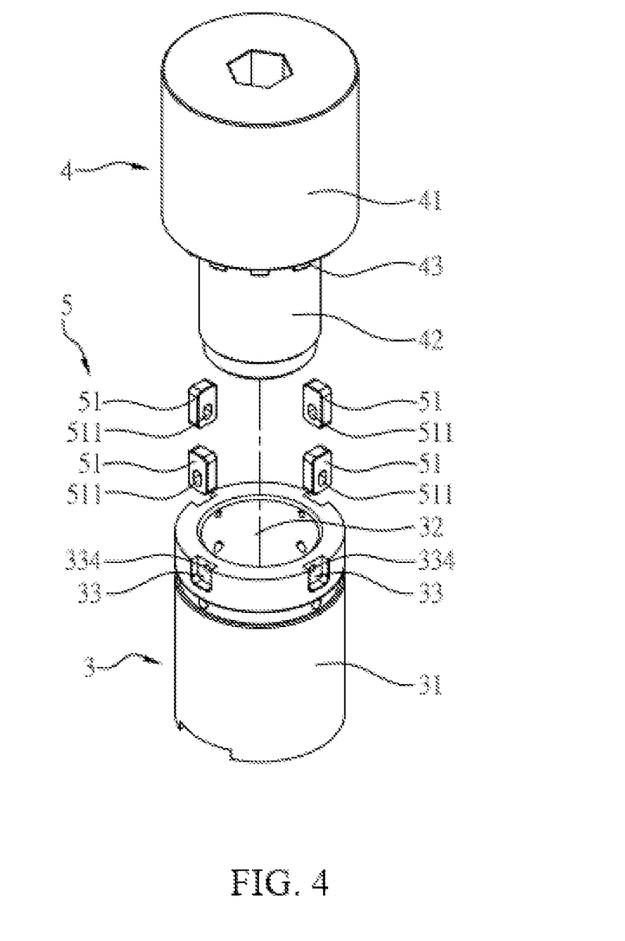
FIG. 4 is a three-dimensional schematic diagram illustrating a breakdown structure of the telescopic unit, the extension unit and the first fixing unit in the first embodiment.

Refer to FIG. 3 and FIG. 4 which show a joint structure of a telescopic cylinder according to a first embodiment of the present disclosure. The joint structure of the telescopic cylinder comprises a telescopic unit 3, an extension unit 4 and a first fixing unit 5, wherein the telescopic unit 3 is a telescopic rod of the telescopic cylinder (please refer to the telescopic rod 25 of the telescopic cylinder 2 as shown in FIG. 2), the extension unit 4 is a joint arranged at the top end of the telescopic unit 3, and the extension unit 4 can be connected to other objects.

The telescopic unit 3 includes a first main body 31, a first combined structure 32 connected to the first main body 31, and a plurality of first fixing structures 33 arranged on the first main body 31, wherein the first main body 31 is a hollowed long-strip-shaped cylinder. The first main body 31 shown in FIG. 3 and FIG. 4 is the top of the first main body 31, and the first combined structure 32 is an internal thread provided at the top of the first main body 31.

The extension unit 4 includes a second main body 41, a second combined structure 42 connected to the second main body 41, and a plurality of second fixing structures 43 arranged on the second main body 41, wherein the first combined structure 32 is screwed to the second combined structure 42. The second main body 41 is a long-strip-shaped cylinder. The second combined structure 42 is an external thread provided at the bottom of the second main body 41 and is provided at the bottom of the second main body 41. The second combined structure 42 can be screwed in the first combined structure 32 such that the second main body 41 is arranged at the top end of the first main body 31, and the structure of the second main body 41 can be selected according to actual usage conditions.

The first fixing unit 5 includes at least one first fixing body 51, wherein the first fixing bodies 51 are simultaneously arranged in the first fixing structures 33 and the second fixing structures 43 and interfere with the first main body 31 and the second main body 41 so as to avoid falling off caused by the spiral movement of the first combined structure 32 and the second combined structure 42. In addition, the first fixing unit 5 may include a set screw 52 arranged on the first main body 31 in a penetrating manner and configured to directly lock the first combined structure 32 arranged on the first main body 31 and the second combined structure 42 arranged on the second main body 41. In one embodiment, the set screw 52 may not be used and should not be a limitation.

Figure 5:
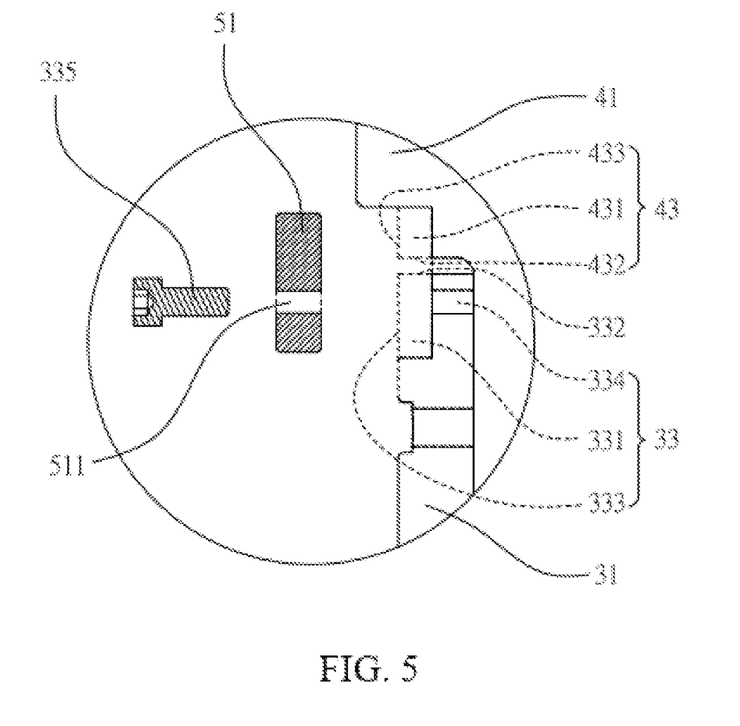
FIG. 5 is a local sectional view illustrating a first fixing structure, a second fixing structure and a first fixing body in the first embodiment.

In view of FIG. 5, in the first embodiment, each of the first fixing structures 33 includes a first recess 331 formed in the first main body 31 and a first fixing opening portion 332 formed in the first main body 31 and connected to the first recess 331. Each of the second fixing structures 43 includes a second recess 431 formed in the second main body 41 and a second fixing opening portion 432 formed in the second main body 41 and connected to the second recess 431. The first fixing opening portion 332 faces the extension unit 4, and the second fixing opening portion 432 faces the telescopic unit 3, so that the first fixing opening portion 332 is arranged opposite the second fixing opening portion 432, and the corresponding first fixing body 51 is simultaneously arranged in the first recess 331 and the second recess 431 by means of the first fixing opening portion 332 and the second fixing opening portion 432. In addition, the width of the first fixing body 51 is in close fit with the width of the first recess 331 and the width of the second recess 431 such that when the first fixing body 51 is simultaneously arranged in the first recess 331 and the second recess 431, two sides of the first fixing body 51 can abut against the first main body 31 and can also abut against the second main body 41, thereby generating the structural interference which is used for fixing the relative positions of the first fixing body 51 and the second main body 41 and further avoiding loosening off caused by the spiral movement of the first combined structure 32 and the second combined structure 42.

In addition, the first fixing structure 33 further includes a first placing opening portion 333 formed in the first main body 31 and connected to the first recess 331, and the second fixing structure 43 further includes a second placing opening portion 433 formed in the second main body 41 and connected to the second recess 431. The first placing opening portion 333 is formed in a side edge of the first main body 31, the second placing opening portion 433 is formed in a side edge of the second main body 41, the first placing opening portion 333 is connected to the first fixing opening portion 332, and the second placing opening portion 433 is connected to the second fixing opening portion 432, so that the first fixing body 51 can enter and exit the first recess 331 and the second recess 431 by means of the first placing opening portion 333 and the second placing opening portion 433.

Preferably, a screw hole 334 is formed in the first fixing structure 33, a through hole 511 is formed in the first fixing body 51, and when the first fixing body 51 is arranged in the first recess 331 and the second recess 431, a screw 335 can stabilize the first fixing body 51 in the first recess 331 and the second recess 431 by means of the through hole 511 and the screw hole 334. In one embodiment, other fixing structures can be used in the first fixing structure 33, or the fixing structure is arranged on the second fixing structure 43, or the fixing structures are arranged in both the first fixing structure 33 and the second fixing structure 43, and the fixing structure should not be a limitation.

Figure 6:
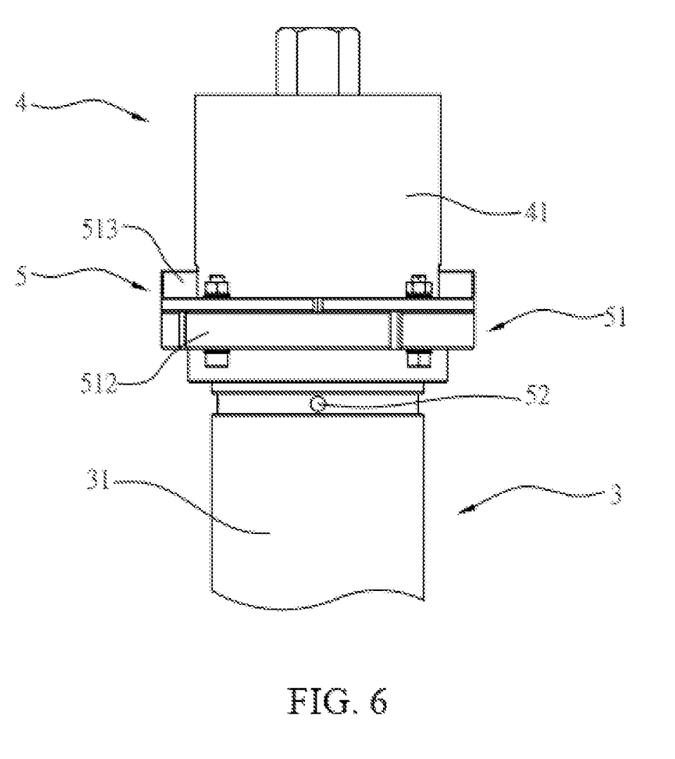
FIG. 6 is a local side view of a joint structure of a telescopic cylinder, illustrating a combined state of a telescopic unit, an extension unit and a first fixing unit according to a second embodiment of the present disclosure.
Figure 7:
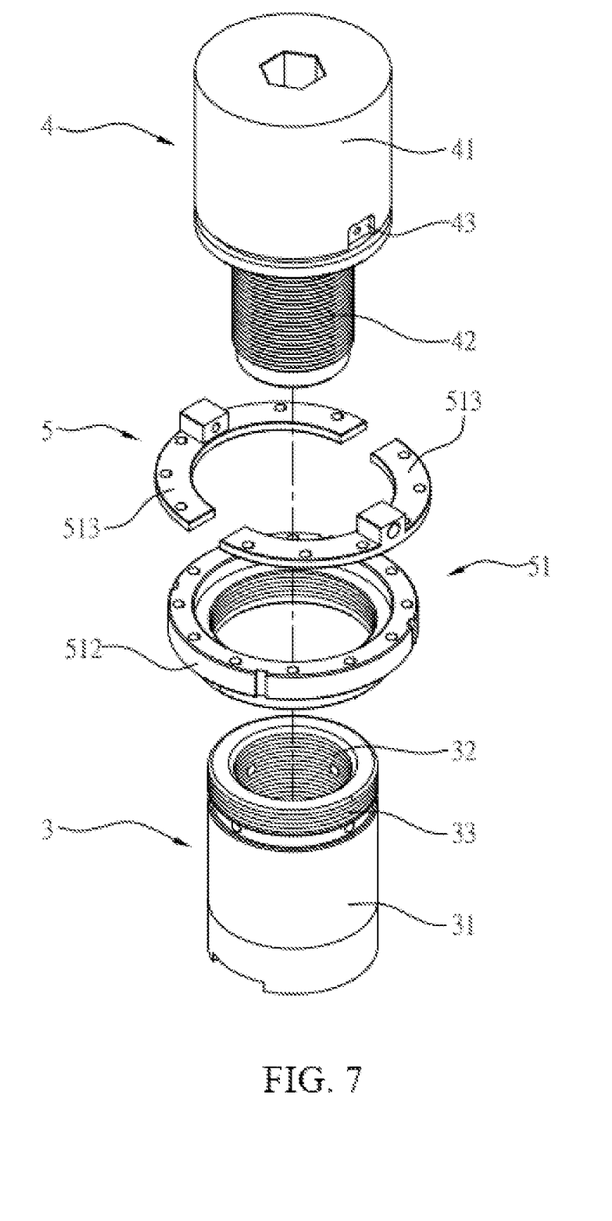
FIG. 7 is a three-dimensional schematic diagram illustrating a breakdown structure of the telescopic unit, the extension unit and the first fixing unit in the second embodiment.

Please refer to FIG. 6 and FIG. 7 which show a joint structure of a telescopic cylinder according to a second embodiment of the present disclosure. The second embodiment is almost identical with the first embodiment, and the similarities are not described in detail herein. The differences lie in that the first combined structure 32 is an internal thread provided on the first main body 31 and allows the second combined structure 42 at the bottom of the second main body 41 to be screwed in. The first fixing structures 33 are external threads provided on the first main body 31, and the thread direction of the first combined structure 32 is opposite to that of the first fixing structures 33. For example, the second combined structure 42 is screwed in the first combined structure 32 in a clockwise direction, the first fixing bodies 51 are screwed on the first fixing structures 33 in a counterclockwise direction, and then the first fixing bodies 51 screwed on the first fixing structures 33 are fixed to the second fixing structures 43. The position and function of the telescopic unit 3 as shown in FIG. 6 and FIG. 7 are the same as the telescopic rod of the telescopic cylinder (please refer to the telescopic rod 25 of the telescopic cylinder 2 as shown in FIG. 2).

In the second embodiment, each of the first fixing bodies 51 includes a first fixing member 512 screwed on the corresponding first fixing structure 33 and a plurality of first positioning members 513 simultaneously fixed to the first fixing member 512 and the corresponding second fixing structure 43, wherein the first fixing member 512 is an annular structure, and a thread is provided on an inner side of the first fixing member 512 such that the first fixing member 512 can be screwed on the first fixing structure 33. The plurality of first positioning members 513 are of half-moon structures, bump structures are arranged above, the half-moon structures of the first positioning members 513 are locked on the first fixing member 512, and the bump structures of the first positioning members 513 are locked on the second fixing structure 43. In one embodiment, the first positioning members 513 may be of other structures and shapes or may be different in quantity, which should not be a limitation.

What is worth mentioning is that the thread direction of the first combined structure 32 arranged on an inner side of the first main body 31 is opposite to that of the first fixing structures 33 arranged on an outer side of the first main body 31, the second main body 41 is screwed with the first combined structure 32 by means of the second fixing structures 43, and the second main body 41 is screwed with the first fixing structures 33 by means of the first fixing bodies 51, so that when a screw force is applied to the second main body 41, the first combined structure 32 and the first fixing structures 33 having opposite threads will make the second fixing structures 43 and the first fixing bodies 51 be mutually spirally restrained without rotational loosening of the structures, thereby preventing the extension unit 4 from falling off from the telescopic unit 3.

Figure 8:
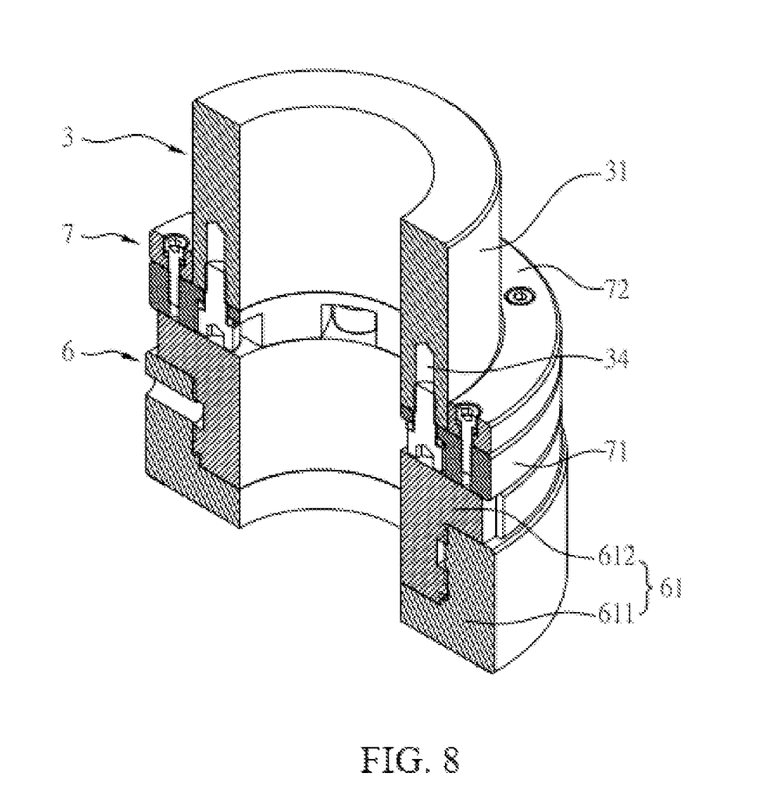
FIG. 8 is a local side view of a joint structure of a telescopic cylinder, illustrating a combined state of a telescopic unit, a movable unit and a second fixing unit according to a third embodiment of the present disclosure.
Figure 9:
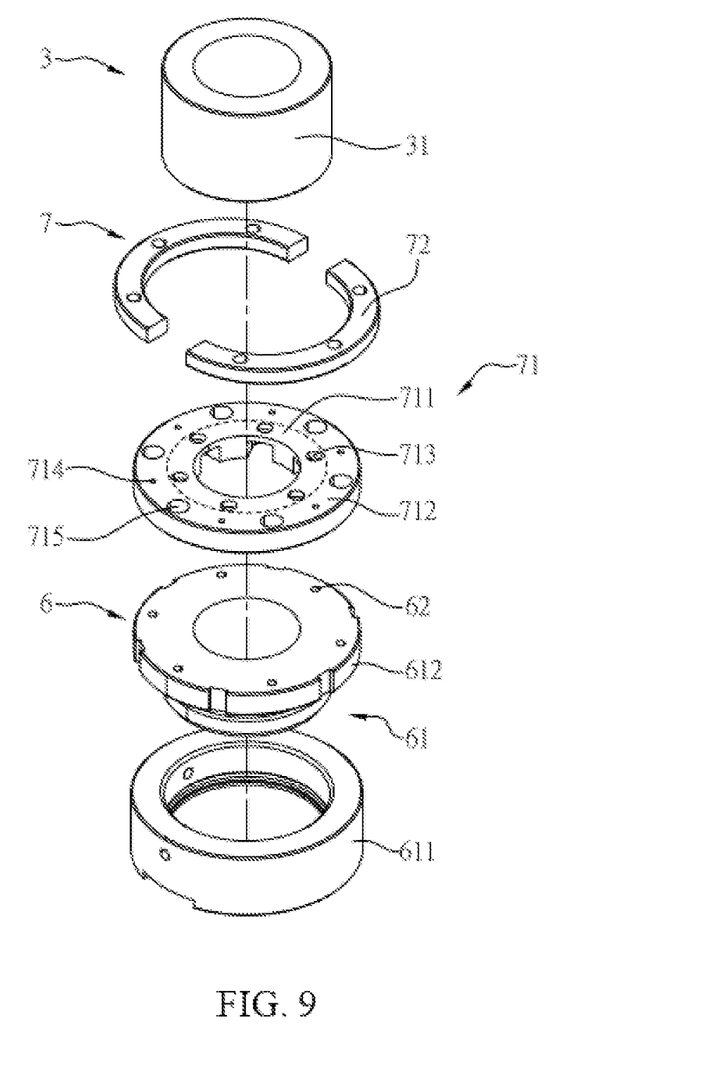
FIG. 9 is a three-dimensional schematic diagram illustrating a breakdown structure of the telescopic unit, the movable unit and the second fixing unit in the third embodiment.

Please refer to FIG. 8 and FIG. 9 which show a joint structure of a telescopic cylinder according to a third embodiment of the present disclosure. The third embodiment is almost identical with the first embodiment, and the similarities are not described in detail herein. The difference lies in that the joint structure of the telescopic cylinder further comprises a movable unit 6 and a second fixing unit 7.

The extension unit 4 is arranged at the top end of the telescopic unit 3 (for example, the Y-shaped joint 26 arranged at the top end of the telescopic rod 25 in FIG. 2), the movable unit 6 is arranged at the bottom end of the telescopic unit 3 (for example, the spiral sleeve 24 arranged at the bottom end of the telescopic rod 25 in FIG. 2), the telescopic unit 3 is a hollowed cylinder and is configured to accommodate a screw of the telescopic cylinder (for example, the screw 23 in FIG. 2), the movable unit 6 is a spiral sleeve sleeved on the screw, and when the screw rotates, the screw can drive the movable unit 6 to move.

The telescopic unit 3 further includes a first clamping structure 34 arranged on the first main body 31. The movable unit 6 includes a third main body 61 and an extending clamping structure 62 arranged on the third main body 61, wherein the structures as shown in FIG. 8 and FIG. 9 are the bottom of the first main body 31 and the top of the third main body 61. The second fixing unit 7 includes a second fixing body 71 arranged between the first clamping structure 34 and the extending clamping structure 62. The first clamping structure 34 is a screw hole formed in the bottom end of the first main body 31, and the extending clamping structure 62 is a screw hole formed in the top end of the third main body 61. In one embodiment, the first clamping structure 34 and the extending clamping structure 62 may adopt other fixing technologies, which should not be a limitation.

In the third embodiment, the third main body 61 includes a sleeve portion 611 and a sleeve cover portion 612 sleeved on the sleeve portion 611 so as to form a portion of balls or roller screws. The balls or the roller screws will be used in the general telescopic cylinder, and a plurality of balls and lubricating oil will be provided between the third main body 61 and the screw so as to improve the sliding state of the third main body 61 on the screw. The sleeve cover portion 612 can seal the plurality of balls inside the sleeve portion 611. Since the balls or the roller screws are of general structures and are not the focus of the present disclosure, they will not be described in detail herein. In one embodiment, the third main body 61 may be of an integrated structure, is not required to be additional provided with the sleeve cover portion 612, and should not be limited by the example of this embodiment.

The second fixing unit 7 further includes a plurality of buffer members 72 fixed to the second fixing body 71, the second fixing body 71 is an annular structure and includes an inner ring portion 711 and an outer ring portion 712 arranged oppositely, the first clamping structure 34 is fixed to an upper surface of the inner ring portion 711, and the extending clamping structure 62 is fixed to a lower surface of the outer ring portion 712. In the third embodiment, a plurality of first through holes 713 are formed in the inner ring portion 711, and screws can penetrate through the plurality of first through holes 713 from the lower side to fix the inner ring portion 711 of the second fixing body 71 to the first clamping structure 34 of the first main body 31. A plurality of second through holes 714 and a plurality of third through holes 715 are formed in the outer ring portion 712, and screws can penetrate through the plurality of third through holes 715 from the upper side to fix the second fixing body 71 to the extending clamping structure 62 of the third main body 61. The plurality of buffer members 72 can be locked on the plurality of second through holes 714 of the outer ring portion 712 by means of a plurality of screws. The plurality of buffer members 72 are of half-moon sheet structures and are configured to cover the screws penetrating through the third through holes 715, so that when the second fixing body 71 is arranged, the screws in the first through holes 713 are blocked by the third main body 61, and the screws in the third through holes 715 are blocked by the buffer members 72, and even if the screws locked on the first main body 31 and the third main body 61 are loosened under the action of an external force, the screws will be blocked and will be prevented from falling off due to loosening, thereby effectively improving the structure safety of the telescopic cylinder.

Please refer to FIG. 2, FIG. 8 and FIG. 9. In the third embodiment, when the spiral sleeve 24 slides in the housing 21 and drives the telescopic rod 25 to telescope relative to the housing 21, the buffer members 72 can prevent the interior of the housing 21 of the telescopic cylinder 2 and the second fixing body 71 from various collisions, thereby prolonging the service life of the telescopic cylinder 2.

What is worth mentioning is that the first main body 31 and the third main body 61 are arranged inside the housing (for example, the housing 21 in FIG. 2) of the telescopic cylinder, thus the design for enhancing a connection structure of the first main body 31 and the third main body 61 will be limited by an accommodating space. The first clamping structure 34 includes a plurality of screw holes which are formed in a bottom surface of the first main body 31 and allow locking by the screws from the lower side. The extending clamping structure 62 includes a plurality of screw holes which are formed in a top surface of the third main body 61 and allow locking by the screws from the upper side. In cooperation with the plurality of first through holes 713, the plurality of second through holes 714 and the plurality of third through holes 715 longitudinally penetrating through the second fixing body 71, the structure strength between the first main body 31 and the third main body 61 can be enhanced, and the lateral expansion of the screws or other structures can also be avoided, thereby helping enhance the structure strength in a limited space.

Figure 10:
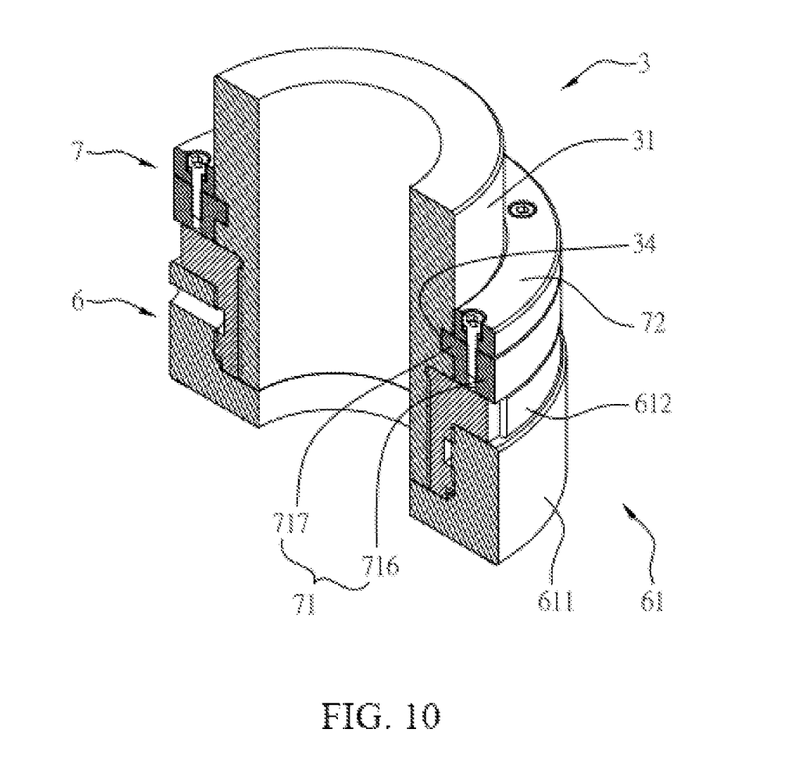
FIG. 10 is a local side view of a joint structure of a telescopic cylinder, illustrating a combined state of a telescopic unit, a movable unit and a second fixing unit according to a fourth embodiment of the present disclosure.
Figure 11:
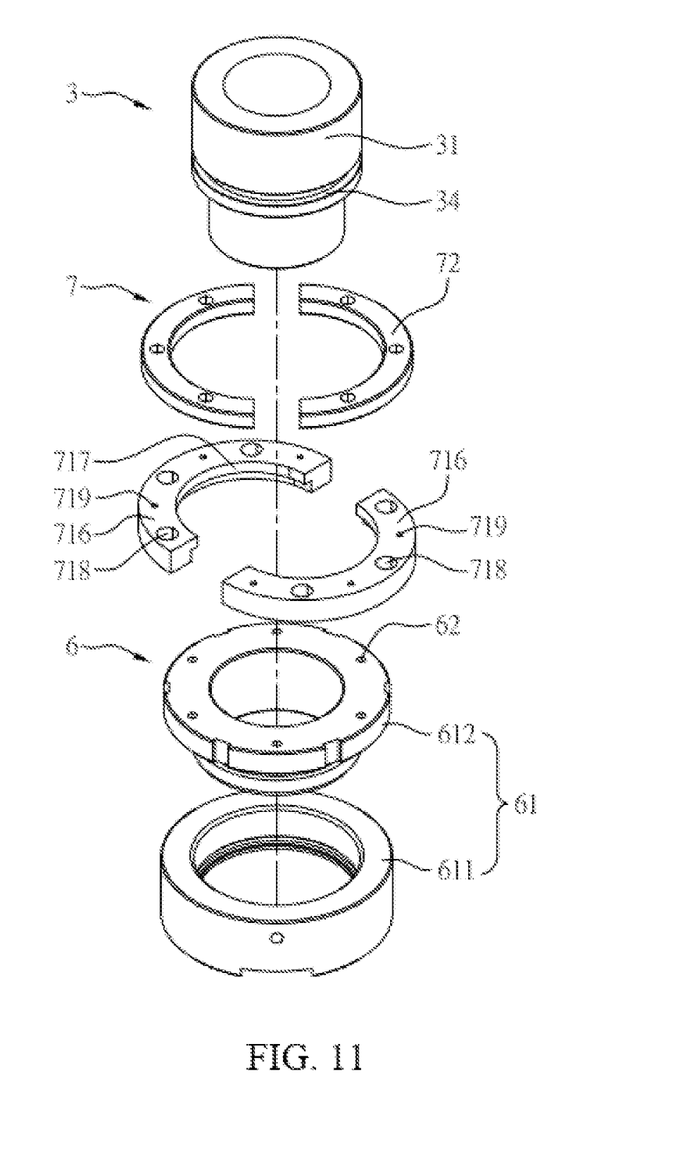
FIG. 11 is a three-dimensional schematic diagram illustrating a breakdown structure of the telescopic unit, the movable unit and the second fixing unit in the fourth embodiment.

Please refer to FIG. 10 and FIG. 11 which show a joint structure of a telescopic cylinder according to a fourth embodiment of the present disclosure. The fourth embodiment is almost identical with the third embodiment, and the similarities are not described in detail herein. The differences lie in that a boss provided with an external thread is arranged at the bottom end of the first main body 31, a recess provided with an internal thread is formed in the top end of the third main body 61, the bottom end of the first main body 31 can be screwed to the top of the third main body 61, the first clamping structure 34 is an annular recess formed in the side edge of the first main body 31, and the second fixing body 71 includes a plurality of second fixing members 716 arranged on the outer side of the first main body 31 and a plurality of clamping blocks 717 arranged on inner sides of the second fixing members 716 respectively.

Preferably, the plurality of clamping blocks 717 form an annular protruding wall on the inner sides of the second fixing members 716, the plurality of clamping blocks 717 can be fixed into the first clamping structure 34 in the shape of the annular recess, and the first clamping structure 34 is in close fit with the plurality of clamping blocks 717 so as to interfere with the longitudinal movement of the first main body 31 and the third main body 61.

The first main body 31 must be spirally separated from the third main body 61, so that when the first main body 31 is screwed to the top end of the third main body 61, the plurality of clamping blocks 717 of the second fixing body 71 can be clamped in the annular recess, then the second fixing members 716 of the second fixing body 71 are locked in the extending clamping structure 62. The plurality of clamping blocks 717 clamped in the annular recess can prevent the first main body 31 from being spirally separated from the third main body 61, and the telescopic cylinder can be operated more safely.

Preferably, a plurality of fourth through holes 718 and a plurality of fifth through holes 719 are formed in the second fixing members 716 of the second fixing body 71. The plurality of fourth through holes 718 can allow screws to be locked in the extending clamping structure 62, after the second fixing body 71 is locked in the extending clamping structure 62, the plurality of buffer members 72 can be locked in the plurality of fifth through holes 719 by means of a plurality of screws, and the plurality of buffer members 72 are half-moon sheet-shaped plates, are configured to cover the fourth through holes 718, and can prevent the screws arranged in the fourth through holes 718 from falling off and make the second fixing body 71 being stably fixed to the third main body 61, thereby enhancing the structure strength of the telescopic cylinder 3.

What is worth mentioning is that although the second fixing unit 7 is arranged between the telescopic unit 3 and the movable unit 6, in one embodiment, the second fixing unit 7 can also replace the first fixing unit 5 to be arranged between the telescopic unit 3 and the extension unit and should not be a limitation.

It can be seen from the above that the joint structure of the telescopic cylinder of the present disclosure does have the following features:

1. Stabilizing the Joint Structure on the Outer Side of the Telescopic Cylinder:

The first fixing unit 5 of the telescopic cylinder can match different device structures to replace the appropriate extension unit 4, and the first fixing unit 5 can interfere with the screwed structure between the telescopic unit 3 and the extension unit 4, thereby effectively stabilizing the joint structure on the outer side of the telescopic cylinder, and preventing the telescopic cylinder from being unscrewed and falling off under the action of the strong external force.

2. Enhancing the Internal Structure Strength of the Telescopic Cylinder:

The second fixing unit 7 can strengthen the combined structure between the telescopic unit 3 and the movable unit 6 and support the force transferred from the extension unit 4, thereby preventing the telescopic unit 3 from falling off from the movable unit 6. Besides, the buffer members 72 of the second fixing unit 7 can block the through holes in the second fixing body 71, can prevent the screws in the through holes from falling off, and can also prevent the second fixing body 71 from loosening, thereby effectively enhancing the internal structure strength of the telescopic cylinder 3.

3. Effectively Using the Internal Space of the Telescopic Cylinder:

The internal space of the telescopic cylinder is limited, so that the first clamping structure 34 refers to the screw holes formed in the bottom of the first main body 31, or is the annular recess formed in the side edge of the first main body 31, thereby allowing the second fixing unit 7 to enhance the internal structure strength of the telescopic cylinder 3. Meanwhile, the internal space of the telescopic cylinder 3 can be effectively used to avoid the lateral expansion of the structures.

In conclusion, the first fixing unit 5 can stabilize the combined structure between the telescopic unit 3 and the extension unit 4 and can prevent the extension unit 4 from being unscrewed and falling off from the telescopic unit 3 when the telescopic cylinder is subjected to the strong external force, and the second fixing unit 7 can stabilize the combined structure between the telescopic unit 3 and the movable unit 6 and can prevent the telescopic unit 3 from falling off from the movable unit 6.

Although the concept herein has been described with reference to particular examples, it is to be understood that these examples are merely illustrative of the principles and applications of the present concept. It is therefore to be understood that numerous modifications may be made to the illustrative examples and that other arrangements may be devised without departing from the spirit and scope of the present concept as defined by the appended claims.

What is claimed is:

1. A joint structure of a telescopic cylinder, comprising:
   a telescopic unit comprising a first main body, a first combined structure connected to the first main body, and at least one first fixing structure arranged on the first main body;
   an extension unit comprising a second main body, a second combined structure connected to the second main body, and at least one second fixing structure arranged on the second main body, the first combined structure being screwed to the second combined structure; and
   a first fixing unit comprising at least one first fixing body, wherein the first fixing body is simultaneously arranged in the first fixing structure and the second fixing structure and interferes with the first main body and the second main body so as to prevent the first combined structure and the second combined structure from spiral movement,
   wherein the first combined structure is an internal thread provided on the first main body, the first fixing structure is an external thread provided on the first main body, a thread direction of the first combined structure is opposite to that of the first fixing structure, and the first fixing body is screwed on the first fixing structure.

2. The joint structure of the telescopic cylinder according to claim 1, wherein the at least one first fixing body comprises:
   a first fixing member screwed on the first fixing structure; and
   at least one first positioning member simultaneously fixed to the first fixing member and the second fixing structure.

* * * * *